United States Patent [19]

Ikeda et al.

[11] Patent Number: 5,433,137
[45] Date of Patent: Jul. 18, 1995

[54] THRUST BEARING STRUCTURE FOR SWASH PLATE COMPRESSOR

[75] Inventors: Hayato Ikeda; Hideo Mori; Toshiyuki Nakajima; Shoji Takemoto, all of Kariya, Japan

[73] Assignee: Kabushiki Kaisha Toyoda Jidoshokki Seisakusho, Kariya, Japan

[21] Appl. No.: 196,645

[22] Filed: Feb. 15, 1994

[30] Foreign Application Priority Data

Feb. 15, 1993 [JP] Japan .................................. 5-025710

[51] Int. Cl.6 ............................................... F01B 3/00
[52] U.S. Cl. ..................................... 92/71; 417/269; 74/60
[58] Field of Search ............................. 92/12.2, 71, 57; 91/499; 417/269; 74/60

[56] References Cited

FOREIGN PATENT DOCUMENTS 56-88975 7/1981 Japan .
60-209674 10/1985 Japan .
62-51776 3/1987 Japan .................................. 417/269

Primary Examiner—Thomas E. Denion
Attorney, Agent, or Firm—Brooks Haidt Haffner & Delahunty

[57] ABSTRACT

A swash plate compressor in which a drive shaft is rotatably supported in a cylinder block having a crank chamber. The swash plate is rotatably disposed on the drive shaft. Thrust bearings are individually fitted between the movable thrust receiving faces of the swash plate and the stationary thrust receiving faces of the cylinder block. As the drive shaft rotates, the swash plate likewise rotates and reciprocates a piston to compress a refrigerant gas. Annular movable ridges are formed on the front and rear side faces of the swash plate concentric around the drive shaft. Stationary ridges are formed concentrically with the movable ridges on the cylinder blocks to face the individually movable ridges. The stationary ridge has a smaller radius than that of the movable ridge. At the front and rear sides of the swash plate, the facing circumferential portions of the movable ridges and the stationary ridges are individually formed with movable and stationary thrust receiving faces for supporting the elastically deformable thrust bearings. At least one of the movable and stationary ridges are formed with escape faces so as to merge into the movable and stationary thrust receiving faces, for establishing escape faces normally between the corresponding thrust bearings. These escape faces expand and reduce the gaps when the thrust bearings are elastically deformed by the action of the swash plate due to the compression reaction forces caused by the reciprocation of the piston.

7 Claims, 4 Drawing Sheets

THRUST BEARING STRUCTURE FOR SWASH PLATE COMPRESSOR

BACKGROUND OF THE INVENTION

1. Field of the Invention

The present invention relates to a swash plate compressor and, more particularly, to an assembly structure of thrust bearings for supporting a swash plate in the axial direction of a drive shaft.

2. Description of the Related Art

A swash plate compressor has a piston fitted reciprocally in a cylinder bore which is formed in a cylinder block. The swash plate is fixed on the drive shaft in a crank chamber which is formed in the cylinder block. When the swash plate is turned according to the rotation of the drive shaft, the piston is reciprocated to effect the suction and compression of a cooling gas in the cylinder bore.

In the compressor disclosed in the Unexamined Japanese Patent Publication No. 62-51776, for example, a compression reaction force is applied to a swash plate 30, as shown in FIG. 1, in response to the reciprocation of the piston. In order to receive this compression reaction force, a pair of ring-shaped elastic thrust bearings 34 are individually sandwiched in slanting positions between the front and rear end portions of a boss 31 of the swash plate 30 and the inner wall faces of a crank chamber 32.

Each of the thrust bearings 34 includes a pair of thrust races 34a and 34b and a set of needles 34c disposed between the races. The inner thrust races 34b are pre-loaded at their outer circumferential sides toward the outer thrust races 34a by means of movable thrust receiving faces 35 of the boss 31. On the other hand, the outer thrust races 34a are pre-loaded at their inner circumferential sides toward the inner thrust races 34b by means of stationary thrust receiving faces 37 of cylinder blocks 36. As a result, the boss 31 of the swash plate 30 is elastically supported and restrained by the paired front and rear thrust bearings 34 so as to have its longitudinal reciprocation restricted by the predetermined load.

In the compressor described above, the movable thrust receiving faces 35 of the swash plate 31 and the stationary thrust receiving faces 37 of the cylinder blocks 36 are positioned at a predetermined spacing from each other. Moreover, the individual thrust receiving faces 35 and 37 are inclined at a predetermined angle $\theta s$ with respect to a line L which is perpendicular to the axis of a drive shaft 38. After thrust bearings 34 have been assembled, however, the angle contained between the thrust races 34a and 34b and the line L is $\theta m$, which is smaller than the angle of inclination $\theta s$. As a result, a gap G is established between the individual races of the assembled thrust bearings 34 and the thrust receiving faces 35, 37.

When the swash plate 30 rotates during operation of the compressor, the swash plate 30 is pushed along the axis of the drive shaft 38 by the compression reaction force of the piston. At this time, the two thrust bearings 34 are elastically deformed to cause the front side thrust bearing 34 (as located at the left-hand side of FIG. 2), for example, to contact in a face-to-face manner the stationary thrust receiving face 37, as shown in FIG. 2. Simultaneously with this, the rear side thrust bearing 34 (as located at the right-hand side of FIG. 2) is elastically deformed to position itself along a plane substantially normal to the drive shaft 38, and to expand the gap G. In this state, an edge portion 35a at the outermost circumference of the stationary thrust receiving face 35, as located at the rear side, and an edge portion 37a at the innermost circumference of the movable thrust receiving face 37 come into local contact with the elastic thrust races 34a and 34b of the rear thrust bearing 34.

During rotation of the swash plate 30 as the compression reaction force on the piston reverses, as described above, two alternating states are generated i.e. the state in which the paired thrust bearings are in face to face (contiguous) contact with the corresponding thrust receiving faces, and the state in which the same are in local (non contiguous) contact. At the time of the face to face contact, the contacting area of the two will increase to prevent partial wear. In the local contact, however, the thrust races 34a and 34b are partially worn, depending on the material of the thrust races. This partial wear shortens the lifetime of the thrust races and deteriorates the function of the thrust bearings and accordingly the elastic responsiveness of the same. As a result the compressor experiences increasing vibration and noise.

SUMMARY OF THE INVENTION

An object of the present invention is to provide a swash plate compressor which is enabled to suppress its vibration and accordingly a noise by preventing the partial wear of the thrust bearings so as to improve the elastic responsiveness of the thrust bearings.

In order to achieve the above object, there is provided a swash plate compressor, in which a drive shaft is rotatably supported in cylinder blocks having a crank chamber disposed therein. The swash plate is in mechanical communication with the drive shaft. Thrust bearings are individually fitted between the movable thrust receiving faces of the swash plate and the stationary thrust receiving faces of the cylinder blocks. When the swash plate is turned as the drive shaft rotates, a piston is reciprocated to compress a cooling gas whereby compression reaction forces are generated and act on the swash plate. A pair of annular movable ridges are formed on the front and rear side faces of the swash plate around the drive shaft. A pair of stationary ridges are so formed on the cylinder blocks as to face the paired movable ridges individually and are positioned concentrically with the movable ridges. The paired stationary ridges have a radius different from that of the movable ridges. At the front and rear sides of the swash plate, the facing circumferential edges of the movable ridges and the stationary ridges are individually formed with movable and stationary thrust receiving faces for supporting the elastically deformable thrust bearings. At least one of the movable ridge and the stationary ridge is formed with an escape face so as to merge into one of the movable and stationary thrust receiving faces, for establishing a gap normally between the corresponding thrust bearing and the escape face. The escape face expands and shrinks the gap when the thrust bearings are elastically deformed due to the compression reaction forces on the swash plate caused by the reciprocation of the pistons.

BRIEF DESCRIPTION OF THE DRAWINGS

The features of the present invention that are believed to be novel are set forth with particularly in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
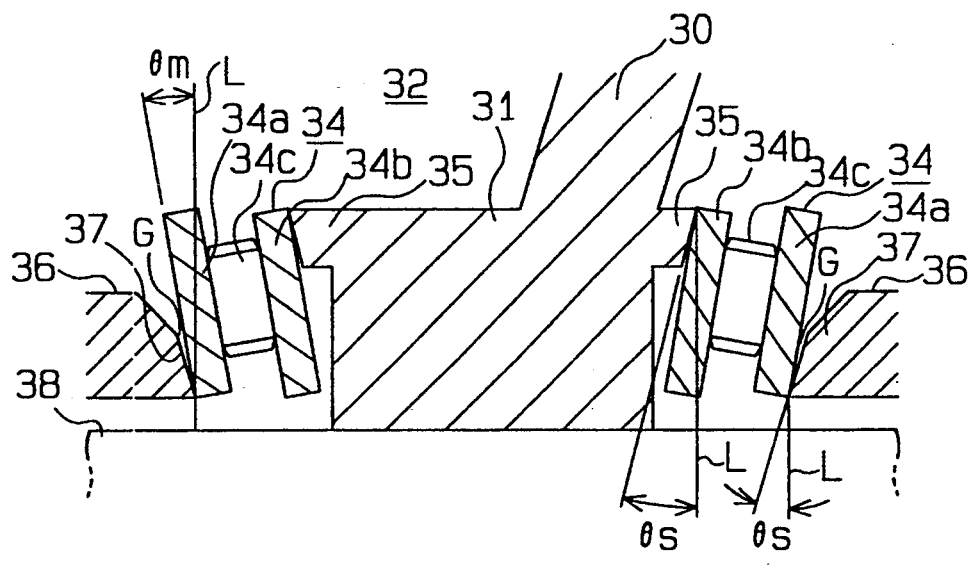
FIG. 1 is a section showing a portion of the conventional swash plate compressor.
Figure 2:
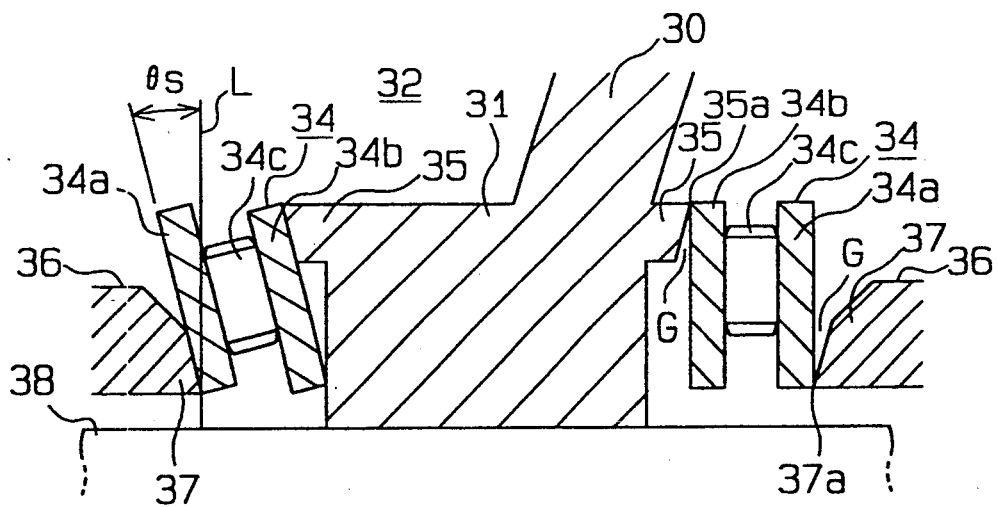
FIG. 2 is a section showing the operating states of the swash plate and the thrust bearings of the compressor shown in FIG. 1.
Figure 3:
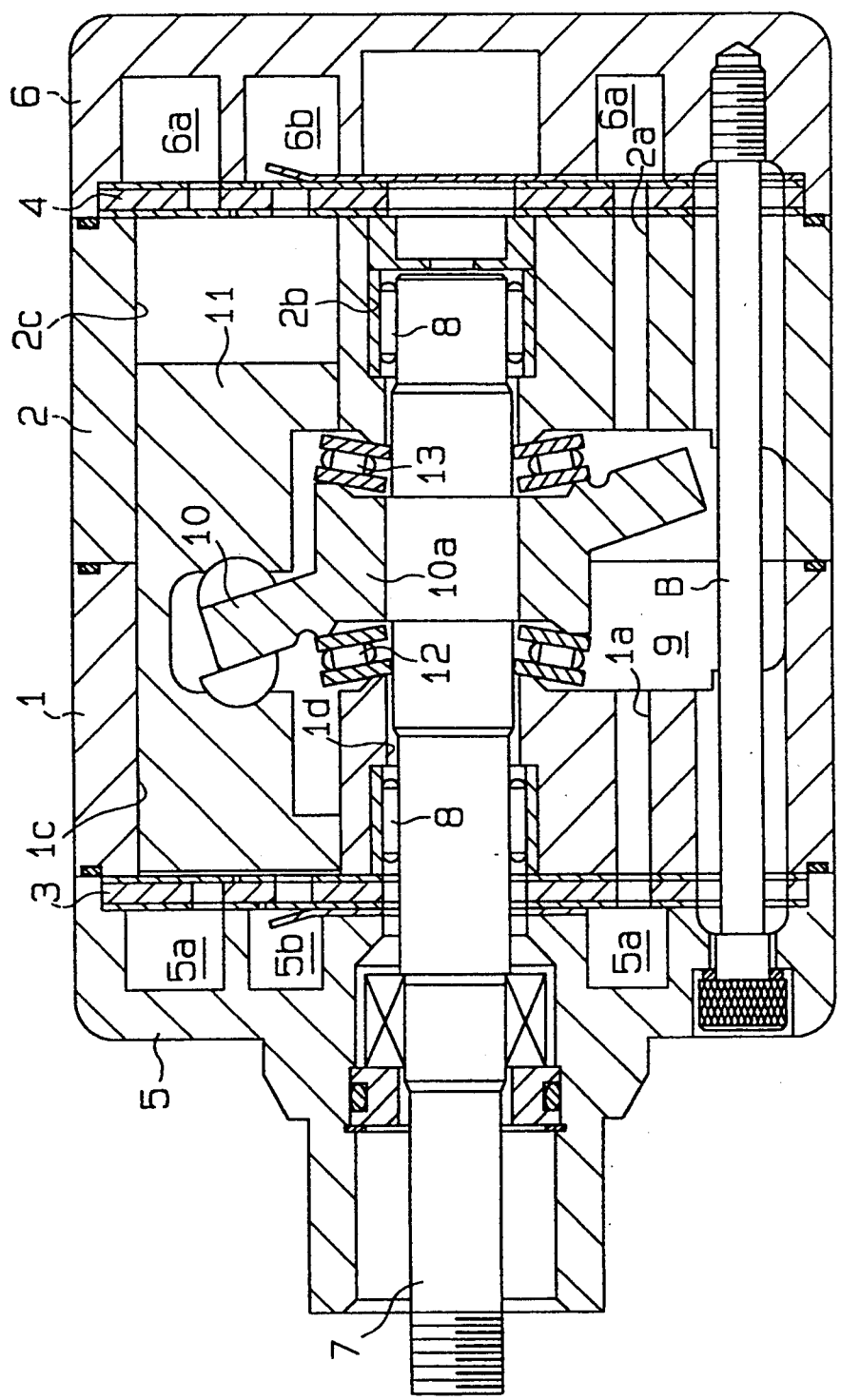
FIG. 3 is a longitudinal section showing a central portion of a compressor according to a first embodiment of the present invention.
Figure 4:
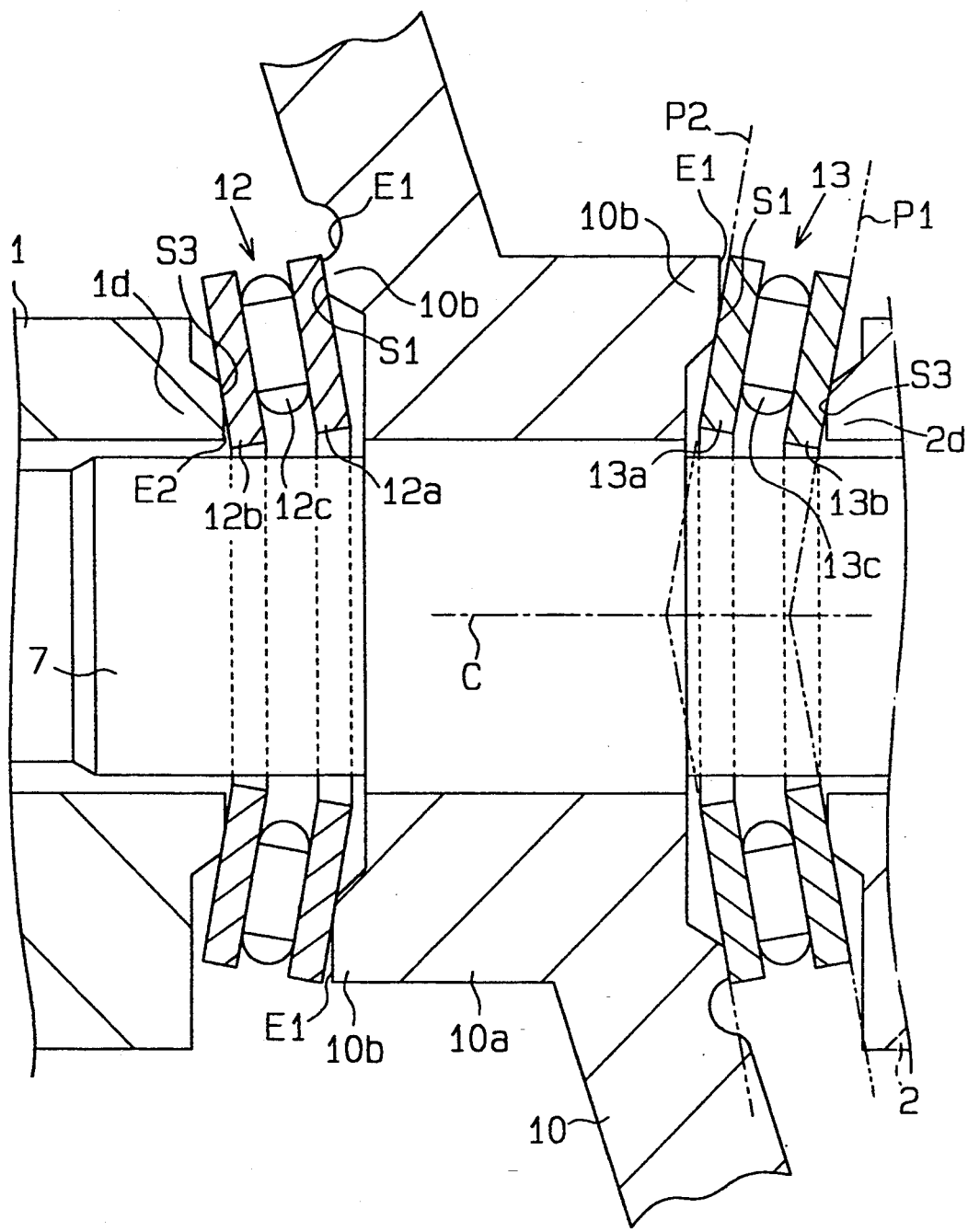
FIG. 4 is an enlarged section of FIG. 3 showing the vicinity of the thrust bearings of the compressor of the first embodiment.
Figure 5:
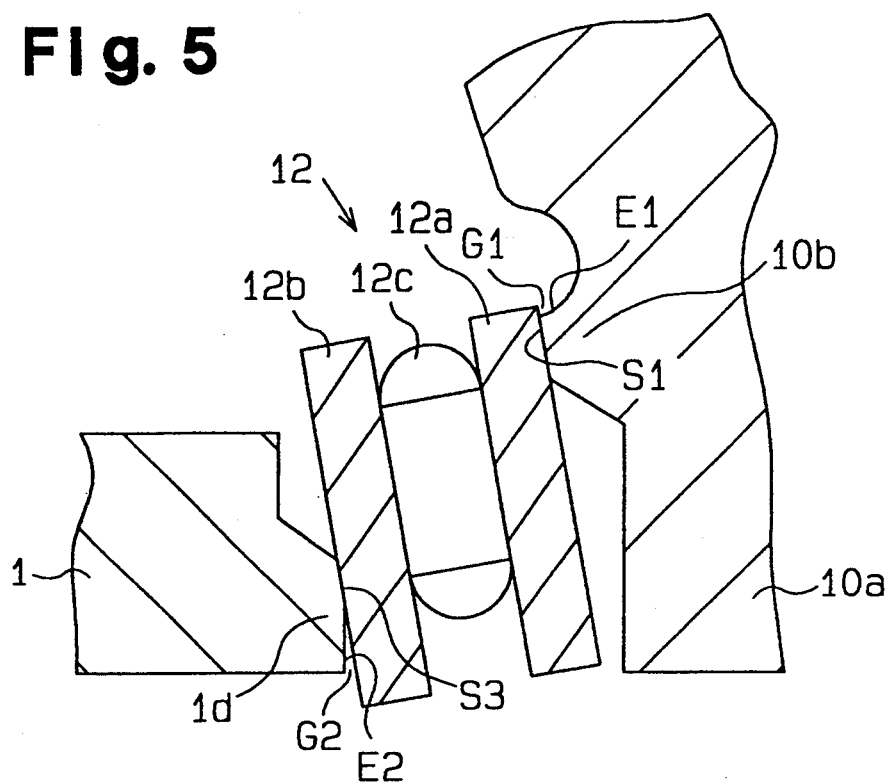
FIG. 5 is an enlarged section showing a portion of the thrust bearing shown in FIG. 4.

Referring now to FIGS. 3 through 5, there will be described a first embodiment of the present invention. As shown in FIG. 3, the front and rear ends of a pair of cylinder blocks 1 and 2 respectively, there are joined through valve plates 3 and 4 to a front housing 5 and a rear housing 6 by means of a plurality of bolts B. The front and rear housings 5 and 6 respectively, have their insides partitioned into suction chambers 5a and 6a and discharge chambers 5b and 6b respectively. A drive shaft 7 is rotatably supported at axial bores 1b and 2b of the cylinder blocks 1 and 2 through a pair of radial bearings 8. The cylinder blocks 1 and 2 define a crank chamber 9 between them, and a swash plate 10 is fixed to the drive shaft 7 with a boss 10a of the swash plate 10 so as to be positioned within the crank chamber 9. The cylinder blocks 1 and 2 are formed with a plurality of cylinder bores 1c and 2c disposed in parallel with the drive shaft 7. In these cylinder bores 1c and 2c, there are disposed double-head pistons 11 such that they can reciprocate. These pistons 11 are individually engaged with the swash plate 10 through shoes.

Thrust bearings 12 and 13 are sandwiched between the opposing end portions of the boss 10a of the swash plate 10 and the cylinder blocks 1 and 2. The suction chambers 5a and 6a are in fluid communication with the crank chamber 9 through intake passages 1a and 2a, respectively. The suction chambers 5a and 6a are connected to a refrigerant gas suction pipe (not shown) whereas the discharge chambers 5b and 6b are connected to a refrigerant gas discharge pipe (not shown).

An assembly structure of the thrust bearings 12 and 13, which forms an essential portion of the present invention will now be described. Thrust bearing 12 includes a pair of thrust races 12a and 12b, a plurality of needles 12c sandwiched between the two thrust races 12a and 12b, and retainers (not shown) supporting the individual needles 12c on the races 12a and 12b. The other thrust bearing 13 likewise includes a pair of thrust races 13a and 13b, a number of needles 13c sandwiched between the two thrust races 13a and 13b; and retainers (not shown) supporting the individual needles 13c on the races 13a and 13b. These thrust bearings 12 and 13 are shaped flat and annular before they are assembled.

As shown in FIG. 4, the boss 10a of the swash plate 10 is formed on its front and rear side walls with a pair of movable ridges 10b which are shaped annular at a first predetermined radius around the center line C of the drive shaft 7. These ridges 10b are formed at their inner circumferences with movable thrust receiving faces S1 and at their outer circumferences with escape faces E1. The two faces S1 and E1 make an obtuse angle where they meet. At the inner side wall faces of the crank chamber 9, the cylinder blocks 1 and 2 are formed at their portions proximate the axial bores 1b and 2b with a pair of stationary ridges 1d and 2d which are concentric with the movable ridges 10b but have a second predetermined smaller radius than that of the movable ridges 10b. These stationary ridges 1d and 2d are formed at their outer circumferences with stationary thrust receiving faces S3 and S3 and at their inner circumferences with escape faces E2 and E2. Just as with the movable thrust receiving faces the two stationary thrust receiving faces S3 and E2 form an obtuse angle where they meet.

The stationary ridges 1d and 2d are arranged so as to face the movable ridges 10b together with their individual thrust receiving faces S1 and S3. These thrust receiving faces S1 and S3 are arranged on a pair of conical circumferences P1 and P2 which are positioned at a predetermined gap and which have their apexes positioned on the center line C of the drive shaft 7. The thrust bearings 12 and 13 are disposed between the thrust receiving faces S1 and S3 so as to be pre-loaded in the thrusting direction and deformed in a frusto-conical shape within the range of allowance of their elastic deformation. As shown in FIG. 4, moreover, the individual thrust races 12a, 12b, 13a and 13b are in facial contact with the corresponding thrust receiving faces S1 and S3 respectively, so as to establish gaps G1 and G2 at all times between the escape faces E1 and E2 and the portions of their facing thrust races.

The operation of the compressor according to the embodiment having the above construction will now be described. Referring now to FIGS. 3, 4 and 5 when the swash plate 10 is turned by the drive shaft 7, as shown in FIG. 3, the pistons 11 are reciprocated to compress the refrigerant gas, which has been sucked into the cylinder bores 1c and 2c from the suction chambers 5a and 6a, and to discharge the compressed gas to the discharge chambers 5b and 6b.

When the cylinder bore 1c at the front side is in the compression stroke, the backward compression reaction force is applied to the swash plate 10 through the piston 11. This compression reaction force deforms the rear thrust bearing 13 elastically in the direction to increase the angle of inclination through elastic deformation. Simultaneously, the pushing force upon the front thrust bearing 12 is decreased to reduce the angle of inclination of the thrust bearing 12.

When the cylinder bore 2c at the rear side is in the compression stroke, the forward compression reaction force is applied to the swash plate 10 through the piston 11 so that the front thrust bearing 12 is elastically deformed in the direction to increase the angle of inclination. Simultaneously, the pushing force upon the rear thrust bearing 13 is decreased to reduce the angle of inclination of the thrust bearing 13. The thrust bearings 12 and 13 then, have their inclination angles increased or decreased depending upon the direction of the compression reaction force on the swash plate 10.

In this embodiment, moreover, the gaps G1 and G2 between the escape faces E1 and E2 and the thrust races are expanded and reduced according to the increase and decrease of the inclination angles of the thrust bearings 12 and 13. The thrust bearings 12 and 13 come into facial contact with the corresponding escape faces E1 and E2 when their angles of inclination are at a minimum. As a result, the thrust bearings 12 and 13 will not be locally worn by the edge portions of the annular ridges 1d, 2d and 10b unlike conventional thrust bearing assemblies even if they are elastically deformed during the running operation of the compressor. Thus, the thrust bearings 12 and 13 respond to the compression reaction force so as to prevent wear and vibration. The tests of comparing with the example of the conventional art have revealed that the vibration and noise decreased about 10%.

Figure 6:
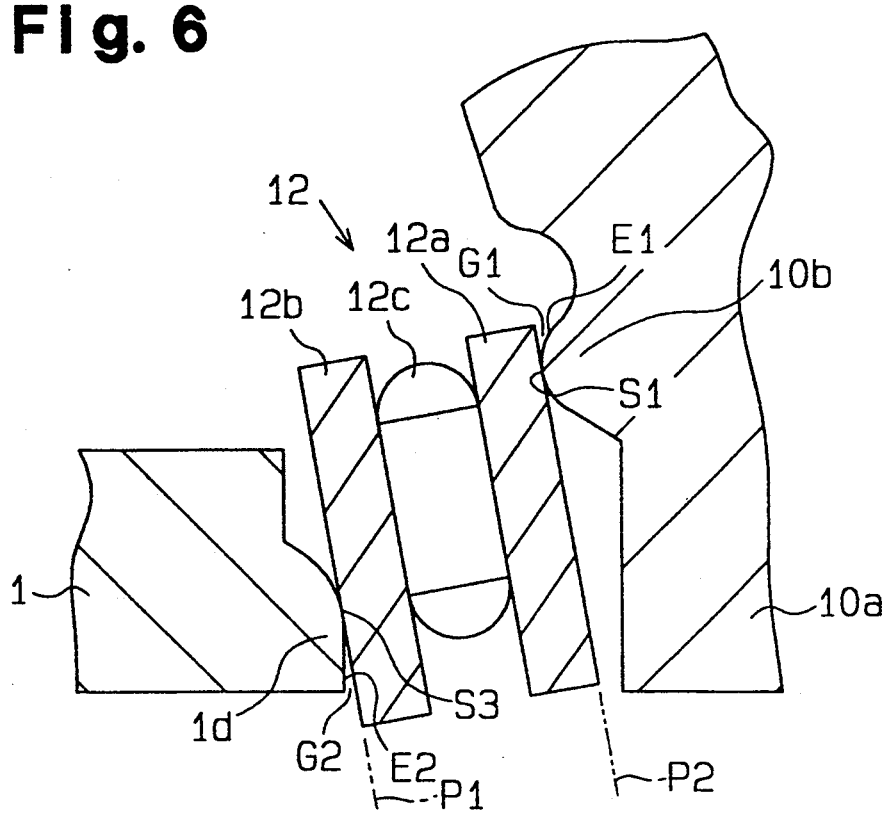
FIG. 6 is a section corresponding to FIG. 5 but shows a swash plate compressor according to a second embodiment of the present invention.

Next, a second embodiment of the present invention will be described with reference to FIG. 6. In this second embodiment, the annular ridges 10b and 1d (although only the front side is shown) of the swash plate 10 and the cylinder block 1 are given arcuate cross-sectional shapes for forming the thrust receiving faces S1 and S3. These opposed thrust receiving faces S1 and S3 are arranged to contact with the paired conical circumferences P1 and P2 which are positioned at the predetermined spacing. The escape faces E1 and E2 are similar to those of the foregoing embodiment and are also formed to merge into the individual thrust receiving faces S1 and S3. As a result, the thrust bearings 12 and 13 are not locally worn even if they are elastically deformed by the compression reaction force, so that their response to the compression reaction forces will suppress vibrations and noise.

The present invention should not be limited to the foregoing embodiments but can be embodied in the following manner:

(1) The thrust bearings 12 and 13 may have their outer circumferences supported by the thrust receiving faces of the stationary annular ridges 1d and 2d and their inner circumferences supported by the thrust receiving faces of the movable annular ridges 10b.

(2) The sliding frictions between the inner circumferences of the thrust bearings 12 and 13 and the corresponding thrust receiving face S1 have a tendency to become higher than those between the outer circumferences of the thrust bearings 12 and 13 and the corresponding thrust receiving face S3. This is because the outer circumferences, in which the contacting area between the thrust bearings and the thrust receiving faces can be set to a higher level, therefore have a lower wear per unit area if the compression reaction forces which act upon the thrust bearings are equal between the inner and outer circumferences of the bearings. As a result, the responsiveness by the elasticity of the thrust bearings 12 and 13 can be improved even if escape faces for avoiding the local wear are formed only on the ridges corresponding to the inner circumferences of the thrust bearings.

What is claimed is:

1. A swash plate compressor including front and rear cylinder blocks which cooperate to form a crank chamber having front and rear stationary thrust receiving faces, a drive shaft rotatably disposed within said front and rear cylinder blocks, a swash plate having front and rear movable thrust receiving faces and being in mechanical communication with said drive shaft within said crank chamber, a pair of elastically deformable thrust bearings fitted individually between said front and rear movable thrust receiving faces and said front and rear stationary thrust receiving faces, and a piston adapted to be reciprocated by the rotation of said swash plate, as said drive shaft rotates, so as to compress a refrigerant gas, the compressor having a thrust bearing structure comprising:

a pair of annular movable ridges formed on the front and rear side faces of said swash plate and located around said drive shaft;

a pair of stationary ridges formed on said cylinder blocks so as to individually face said movable ridges and positioned concentrically with said movable ridges but each having a radius different from that of each of said movable ridges;

said movable and stationary thrust receiving faces formed individually at the front and rear sides of said swash plate and said cylinder blocks on the facing circumferential portions of said movable ridges and said stationary ridges, for supporting said thrust bearings in an elastically deformable manner; and escape faces each so formed on at least one of said movable ridges and said stationary ridges as to merge into at least one of said movable and stationary thrust receiving faces, for establishing gaps normally between themselves and the corresponding thrust bearings, said gaps expanding and reducing when said thrust bearings are elastically deformed due to the compression reaction forces acting on said swash plate when said piston reciprocates.

2. A thrust bearing structure according to claim 1, wherein each of said stationary ridges has a radius smaller than that of each of said movable ridges.

3. A thrust bearing structure according to claim 1, wherein said movable and stationary thrust receiving faces are arranged to contact with a pair of conical circumferences which are arranged at a predetermined spacing from each other and which have their apexes positioned on the center line of said drive shaft.

4. A thrust bearing structure according to claim 3, wherein said movable and stationary thrust receiving faces are arranged on said circumferences.

5. A thrust bearing structure according to claim 3, wherein said stationary ridges and said movable ridges have arcuate cross sections to form curved stationary and movable thrust receiving faces.

6. A thrust bearing structure according to claim 1, wherein each of said thrust bearings includes a pair of elastically deformable races supported by said stationary or movable thrust receiving faces, and a plurality of needles held between said paired races.

7. A swash plate compressor including front and rear cylinder blocks which cooperate to form a crank chamber having front and rear stationary thrust receiving faces, a drive shaft rotatably disposed within said cylinder blocks, a swash plate having front and rear movable thrust receiving faces and disposed in mechanical communication with said drive shaft so as to be positioned in said crank chamber, a pair of elastically deformable thrust bearings each of which is disposed between said front and rear movable thrust receiving faces and said front and rear stationary thrust receiving faces respectively, and a piston adapted to be reciprocated by the rotation of said swash plate, as said drive shaft rotates, so as to compress a refrigerant gas, the compressor having a thrust bearing structure comprising:

a pair of annular movable ridges formed on the front and rear side faces of said swash plate and located around said drive shaft;

a pair of stationary ridges formed on said cylinder blocks so as to face said movable ridges individually and positioned concentrically with said movable ridges but each having a radius different from that of each of said movable ridges;

movable and stationary thrust receiving faces formed individually at the front and rear sides of said swash plate and said cylinder blocks on the facing circumferential portions of said movable ridges and said stationary ridges, for supporting said elastically deformable thrust bearings, said movable and stationary thrust receiving faces being arranged to contact with a pair of conical circumferences which are arranged at a predetermined spacing from each other and which have their apexes positioned on the center line of said drive shaft, and said movable and stationary thrust receiving faces being adapted to support said elastically deformable thrust bearings such that said thrust bearings may be in facial contact with said movable and stationary thrust receiving faces; and escape faces each so formed on at least one of said movable ridges and said stationary ridges as to merge into at least one of said movable and stationary thrust receiving faces, for establishing gaps normally between themselves and the corresponding thrust bearings, said gaps expanding and reducing when said thrust bearings are elastically deformed due to the compression reaction forces acting on said swash plate when said piston reciprocates.

* * * * *